Patented Sept. 7, 1943

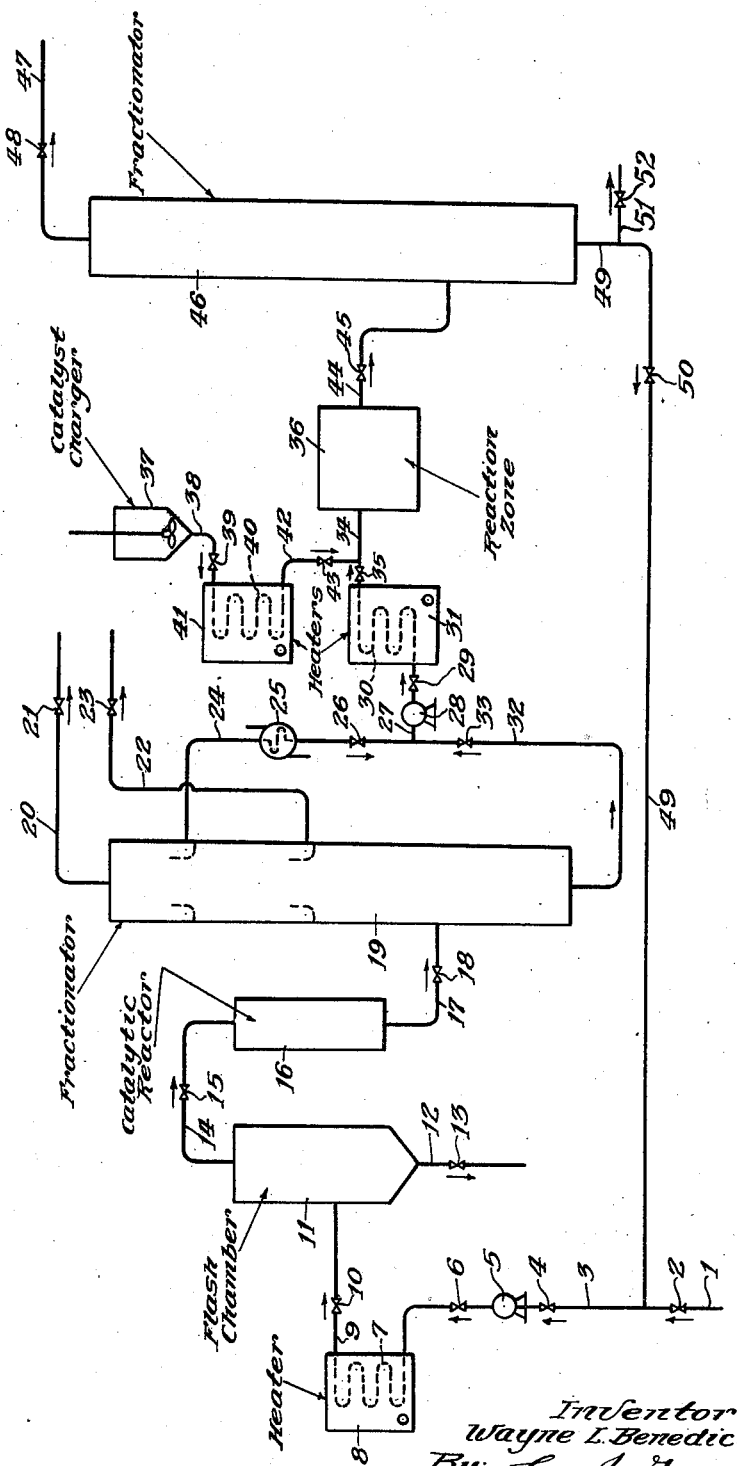

2,328,773

UNITED STATES PATENT OFFICE 2,328,773

CATALYTIC CONVERSION OF HYDROCARBONS

Wayne L. Benedict, Chicago, Ill., assignor to Universal Oil Products Company, Chicago, Ill., a corporation of Delaware Application January 8, 1940, Serial No. 312,854

9 Claims. (Cl. 196—52)

This invention relates to a process for converting hydrocarbon oil into substantial yields of desirable products including gasoline suitable for use in aviation motor fuel. More particularly, it concerns a process for catalytically cracking hydrocarbon oil and converting the resultant gasoline into substantial yields of high antiknock gasoline which is relatively free of olefin hydrocarbons.

The use of various catalytic agents to assist the thermal conversion of hydrocarbon oil to motor fuel has been practiced. Among the catalysts proposed are the reduced metal catalysts including iron, cobalt, etc., which are subject to a number of disadvantages including the fact that they are poisoned by sulfur compounds which may be present in the oils undergoing conversion and furthermore that they tend to promote gas and carbon-forming reactions with the net result that the catalyst life is comparatively short.

Another type of cracking catalyst is the activated earth type in which naturally-occurring clays are treated with acids or other chemicals to increase their catalytic activity.

Still another type of catalyst is made up of activated alumina or magnesia which may have deposited thereon various promoting oxides from the left-hand column of the 4th, 5th and 6th groups of the periodic table and include particularly such oxides as those of chromium, molybdenum, vanadium, etc.

A further type of catalyst, which is the preferred material of this invention, is the so-called silica-alumina, silica-zirconia, and silica-alumina-zirconia composite which is manufactured by the separate or simultaneous precipitation of the component compounds followed by washing, drying and calcining steps whereby a finished catalyst is prepared. Such catalysts are prepared under such conditions that alkali-metal ions are substantially eliminated in order to obtain adequate catalytic activity and stability in so far as an extended life is concerned.

The various catalysts may be used in the form of preformed shapes such as pellets, spheres, briquettes, etc., or in the form of finely divided powders which are carried in suspension in a stream of liquid or vaporized hydrocarbon. The temperatures under which the catalysts have been used range from approximately 500–1200° F. and pressures from substantially atmospheric to 1000 pounds per square inch or higher. The present invention is an improved means of obtaining the benefits of cracking catalysts.

In one specific embodiment the present invention comprises a process for converting hydrocarbon oil into substantial yields of gasoline suitable for use in aviation motor fuel which comprises contacting said hydrocarbon oil with particles of cracking catalyst contained in a reactor at a temperature of approximately 900–1200° F. and a pressure substantially atmospheric, fractionating the reaction products into gas, gasoline, an intermediate boiling fraction and insufficiently converted oil, removing the gas and the intermediate boiling fraction, mixing the gasoline and the insufficiently converted oil, contacting the mixture with a powdered cracking catalyst at a temperature of approximately 500–900° F. and a pressure of 50–1000 pounds per square inch, fractionating the reaction products into substantially olefin-free gasoline and insufficiently converted oil containing the catalyst in suspension, mixing the suspension with the original hydrocarbon oil, heating the mixture to a temperature within the range of 900–1200° F., passing the heated mixture to a flashing zone, removing a residual portion containing catalyst in suspension, and passing the vaporous portion to contact with said catalyst particles as previously mentioned.

One embodiment of the present invention is illustrated in the accompanying drawing, which is purely diagrammatic and should not be construed as limiting the process to the exact apparatus or flow shown. No attempt has been made to draw the various parts of the process in proportion or to any scale.

Referring to the drawing, hydrocarbon oil which may include a distillate fraction of petroleum oil, or in certain instances topped crude oil, is introduced through line 1, valve 2, line 3, valve 4, pump 5, valve 6 to coil 7 which is disposed in heater 8. The heated oil passes through line 9 and valve 10 to flash chamber 11. A residual portion is withdrawn through line 12 and valve 13. The vaporous portion is removed through line 14 and valve 15 to catalytic reactor 16. The reactor may comprise manifolded tubes or a chamber containing catalyst particles disposed therein. The reactor may be supplied in duplicate in order to permit a continuous process wherein one reactor is in the process phase and the other reactor in the reactivation phase of a complete cycle. The catalyst container may be equipped so that additional heat may be introduced into the system as for example in the case of tubes which may be disposed in a heated zone. The temperature at which the reaction is carried out is within the range of approximately 900–1200° F. and a pressure of substantially atmospheric or slightly superatmospheric, say of the order of 50–150 pounds per square inch. The reaction products pass through line 17, valve 18 to fractionator 19. Process gases containing poylmerizable olefin hydrocarbons are removed through line 20 and valve 21. An intermediate boiling fraction which has an initial boiling point as a rule in excess of 300° F. and may comprise a naphtha fraction suitable for blending with automobile motor fuel or may comprise a furnace distillate or tractor fuel, is removed through line 22 and valve 23. A suitable gasoline fraction, for example, of about 300° F. end-point, may be removed through line 24, cooler 25, valve 26, line 27, pump 28, valve 29 to coil 30 which is disposed in heater 31. Insufficiently converted oil is removed from fractionator 19 through line 32 and valve 33 joining with line 27 and being mingled therein with the gasoline from line 24. The mixture is heated to a temperature within the range of 500–900° F. and a superatmospheric pressure of 50–1000 pounds per square inch and suitably of the order of 200–400 pounds per square inch, and is passed through line 34 and valve 35 to catalytic reaction zone 36. A powdered catalyst which may be the same or different from that used in reactor 16, but which is in finely divided form, is introduced from the catalyst charger 37 through line 38, valve 39, coil 40 which is disposed in heater 41, and through line 42 and valve 43 which joins with line 34. The catalyst may be suspended in a portion of the charging stock or more suitably in an intermediate boiling fraction which is relatively refractory to catalytic cracking. The reaction products from the reaction zone, which is any suitable type of reactor including a coil disposed in a furnace or a tower containing suitable contacting members, pass through line 44, valve 45 to fractionator 46. Gasoline which is substantially olefin-free is removed through line 47 and valve 48. Insufficiently converted oil containing catalyst in suspension is passed through line 49 and valve 50 to line 3 and is returned thence by previously described routes to flash chamber 11. The spent catalyst suspended in residual oil is removed through line 12 and valve 13 to a suitable separation step not shown, and may be recovered and reactivated by contact with an oxygen-containing gas in an exterior reactivator which is not illustrated. The residual oil may be used for fuel or other purposes. It is the practice to maintain a liquid level in flash chamber 11 and to introduce the heated hydrocarbon oil-catalyst mixture from heater 8 at a point near the bottom of the flash chamber. The temperature maintained in the flash chamber is somewhat in excess of that to be used in reactor 16 so that a considerable amount of reaction takes place at this point. Moreover the flash chamber is maintained at a pressure in excess of that employed in reactor 16 in order to maintain a part of the oil in the liquid form. The exact conditions of temperature and pressure used at this point will depend entirely upon the character of the charging stock and of the residual oil which it is desired to make. A portion or all of the fractionator bottoms containing spent catalyst in suspension may be withdrawn through line 51 and valve 52.

The process makes use of the advantages of both a catalyst in fixed beds of granules or preformed catalyst shapes, and of powdered catalyst. When using a fixed catalyst at a temperature in excess of 900° F., reactivation with an oxygen-containing gas, which is necessary at regular intervals, can be carried out with no delay in heating the catalyst to a temperature at which combustion can be started. On the other hand, when using a cracking catalyst in the relatively low temperature ranges of 500–900° F., some means of heating the catalyst to a temperature in excess of 900° F. must be resorted to after the processing step has been completed and before the reactivation step is begun. This occasions considerable delay and moreover often results in considerable liquid volume losses of the hydrocarbon oil charged due to the fact that a portion of the oil is retained by adsorption on the catalyst particles. Furthermore, after reactivation is complete, it is necessary to cool the catalyst bed from the higher level of reactivation to the lower level of processing in order to avoid undesired reactions which occur in the higher temperature range. This also occasions considerable delay since the peak temperature of reactivation is ordinarily of the order of 1300–1500° F.

When employing a powdered catalyst under the low temperature conditions, however, various means of recovering the residual oil may be employed, such as washing the catalyst with a low-boiling solvent, treating the mixture with water containing a wetting agent whereby the catalyst separates substantially free of oil, etc. The reactivation can be carried out under any desired conditions at the convenience of the operator and after being cooled, the catalyst is returned to the system. The reactivation step thus entails a minimum loss of hydrocarbon oil and no loss in time in the processing step. It furthermore makes unnecessary the use of additional reactors which must be provided where fixed beds of catalyst are used in order to compensate for the added time of heating, reactivating and cooling.

A further advantages lies in the fact that the partially spent catalyst is contacted with the incoming oil and effects a considerable amount of conversion prior to the introduction of the oil into the fixed catalyst bed at the higher temperature. Thus a maximum conversion is obtainable. It further permits the selection of the most active catalyst for use in the fixed catalyst reactor and the use of a different catalyst which may be more desirable for use in the powdered catalyst reactor.

The following example is given to illustrate the usefulness and practicability of the process, but should not be construed as limiting it to the exact conditions given therein.

When processing a Midcontinent topped crude oil in the manner described using a silica-alumina-zirconia catalyst, the catalyst in reactor 16 may be used in the form of ¼" diameter spheres at a processing temperature of 930° F. and pressure of approximately 30 pounds per square inch. The gas may be removed from the fractionator and subjected to catalytic polymerization. A side cut boiling in the range of 300–500° F. may be removed for use as high grade tractor fuel. The 300° F. end point gasoline mixed with the higher boiling portion of insufficiently converted oil, heated to a temperature of 800° F., combined with a silica-alumina cracking catalyst in finely divided form and passed through a tubular reactor maintained at a temperature of 800° F. and a pressure of approximately 400 pounds per square inch, has an octane number of approximately 77 and a bromine number of about 2. The residual oil containing the catalyst in suspension may be mixed with the topped crude oil and heated to a temperature of 1000° F., passed to flash chamber 11 which is maintained at about 950° F. and a pressure of 200 pounds per square inch. A residual oil containing spent catalyst in solution may be continuously withdrawn and a vaporous portion passed therefrom into reactor 16 as described. A total yield of approximately 50% of 300° F. end point gasoline may be obtained together with 18% of tractor fuel and 10% of gasoline from the polymerizable olefins in the gases. The residue may be used as fuel oil.

I claim as my invention:

1. A process for converting hydrocarbon oil into substantial yields of valuable products including high antiknock gasoline which comprises contacting said hydrocarbon oil in vaporous form with a granular cracking catalyst under catalytic cracking conditions of temperature and pressure, fractionating the reaction products into gas, gasoline and insufficiently converted oil, mixing a portion of said gasoline and said insufficiently converted oil, heating the mixture to a temperature of approximately 500-900° F., mixing therewith a heated powdered catalytic agent, treating the mixture in a reaction zone under conditions of temperature and pressure adequate to effect substantial conversion thereof into substantially olefin-free gasoline, fractionating the reaction products into gas, gasoline, and insufficiently converted oil containing said catalytic agent in suspension, combining said insufficiently converted oil with said hydrocarbon oil, heating the mixture to a temperature within the range of 900-1200° F., passing the heated mixture to a flashing zone, removing a residual oil containing spent catalyst in suspension, and supplying the vaporous portion to contact with said granular cracking catalyst.

2. A process for converting hydrocarbon oil into substantial yields of valuable products including substantially olefin-free gasoline which comprises mixing said hydrocarbon oil with an insufficiently converted oil and partially spent powdered catalyst produced as hereinafter described, heating the mixture to a temperature within a range of approximately 900-1200° F., passing the heated mixture to a flashing zone at reduced pressure, removing therefrom a residual portion containing spent catalyst in suspension, passing the vaporous portion to primary catalytic cracking step, therein contacting said vapors with particles of cracking catalyst at a temperature and pressure adequate to effect substantial conversion thereof into olefin-containing gasoline, fractionating the reaction products into gas, gasoline, and insufficiently converted oil, combining a portion of said gasoline with said insufficiently converted oil, heating the mixture to a temperature within the range of 500-900° F. and under a pressure of 50-1000 pounds per square inch, mixing therewith a powdered catalytic composite, treating the mixture under conditions of temperature and pressure adequate to effect substantial conversion thereof into substantially olefin-free gasoline, fractionating the reaction products into gas, gasoline and insufficiently converted oil containing said catalyst in suspension and combining said insufficiently converted oil and said catalyst with said hydrocarbon oil as previously described.

3. A process for converting hydrocarbon oil into substantial yields of valuable products including gas and gasoline which comprises mixing said hydrocarbon oil with a suspension of partially spend catalyst in an insufficiently converted oil produced as hereinafter described, heating the mixture to a temperature within the range of approximately 900-1200° F. and at a substantially superatmospheric pressure, passing the mixture to a flashing zone at reduced pressure, removing therefrom a residual oil containing said catalyst in suspension, passing a vaporous fraction to a primary catalytic cracking step, contacting the vapors with formed particles of cracking catalyst under conditions of temperature and pressure adequate to effect substantial conversion into olefin-contining gasoline, fractionating the reaction products into gas, gasoline, an intermediate boiling fraction and insufficiently converted oil, removing said intermediate boiling fraction, mixing said gasoline and said insufficiently converted oil, heating the mixture to a temperature within the range of approximately 500-900° F., mixing therewith a powdered cracking catalyst, passing the mixture to a secondary cracking step under conditions of temperature and pressure adequate to produce a substantially olefin-free gasoline, fractionating the reaction products into gas, gasoline and insufficiently converted oil containing partially spent catalyst in suspension, and combining the suspension with said hydrocarbon oil as previously described.

4. A process for converting hydrocarbon oil into substantial yields of valuable products including high antiknock gasoline which comprises mixing said hydrocarbon oil with an insufficiently converted oil containing catalyst in suspension produced as hereinafter described, heating the mixture to a temperature within the range of 900-1200° F. and a pressure of approximately 100-1000 pounds per square inch, passing the mixture to a flashing zone maintained at a temperature in excess of 900° F., maintaining a liquid level of residual oil containing catalyst in suspension in said flashing zone, continuously withdrawing a portion of said residual oil, passing the vapors from the flashing zone to a primary cracking step at a temperature in the range of approximately 900-1200° F., contacting the vapors with preformed particles of cracking catalyst, fractionating the reaction products into gas, gasoline and insufficiently converted oil, mixing a portion of said gasoline with said insufficiently converted oil, adding thereto a powdered catalyst and passing the mixture to a secondary cracking step at a temperature within the range of 500-900° F. and a pressure of 50-1000 pounds per square inch, fractionating the reaction products into gasoline, gas and insufficiently converted oil containing partially spent catalyst in suspension, and mixing the suspension with said hydrocarbon oil as previously described.

5. The process for converting hydrocarbon oil into substantial yields of valuable products including high antiknock gasoline which comprises mixing said hydrocarbon oil with partially spent powdered catalyst suspended in an insufficiently converted oil produced as hereinafter described, heating the mixture to a temperature within the range of 900-1200° F., passing the heated mixture to a flashing zone, removing liquid residue containing said catalyst in suspension, passing vapors from said flashing zone to contact with preformed cracking catalyst particles, fractionating the reaction products into gas, gasoline and insufficiently converted oil, mixing a portion of said gasoline and said insufficiently converted oil, heating the mixture to a temperature within the range of 500–900° F., mixing therewith a powdered cracking catalyst selected from the group consisting of silica-alumina, silica-zirconia and silica-alumina-zirconia, passing the mixture to a reaction zone under conditions of temperature and pressure adequate to produce a substantially olefin-free gasoline, fractionating the reaction products into gas, gasoline and insufficiently converted oil containing said catalyst in suspension, and mixing the suspension with said hydrocarbon oil.

6. A conversion process which comprises passing hydrocarbon vapors through a bed of cracking catalyst at a temperature in the approximate range of 900–1200° F., to form olefinic gasoline therefrom, fractionating the resultant products to separate gasoline fractions, insufficiently converted products and an intermediate product, recovering said intermediate product, passing at least a portion of said gasoline fractions and at least a portion of said insufficiently converted products through a reaction zone in admixture with a powdered cracking catalyst and therein subjecting the mixture to a temperature in the approximate range of 500–900° F., whereby to produce substantially olefin-free gasoline, and recovering the last-named gasoline.

7. A conversion process which comprises passing hydrocarbon vapors through a bed of cracking catalyst at a temperature in the approximate range of 900–1200° F. to form olefinic gasoline therefrom, fractionating the resultant products to separate a gasoline fraction having an end boiling point of about 300° F., and intermediate product containing the heavier gasoline fractions, and insufficiently converted oil, recovering said intermediate product, passing the first-mentioned gasoline fraction and the insufficiently converted oil through a reaction zone in admixture with a powdered cracking catalyst and therein subjecting the mixture to a temperature in the approximate range of 500–900° F., whereby to produce substantiallly olefin-free gasoline, and recovering the last-named gasoline.

8. A conversion process which comprises passing hydrocarbon vapors through a bed of cracking catalyst at a temperature in the approximate range of 900–1200° F. to form olefinic gasoline therefrom, passing insufficiently converted products of said cracking step and at least a portion of said olefinic gasoline through a reaction zone in admixture with a powdered cracking catalyst and therein subjecting the mixture to a temperature in the approximate range of 500–900° F., whereby to produce substantially olefin-free gasoline, separating the resultant products into vapors and a suspension of unvaporized oil and powdered catalyst, fractionating and condensing the vapors, heating at least a portion of said suspension to a temperature in the approximate range of 900–1200° F. and passing vapors thus formed through said bed of catalyst.

9. A conversion process which comprises passing hydrocarbon vapors through a bed of cracking catalyst at a temperature in the approximate range of 900–1200° F. to form olefinic gasoline therefrom, fractionating the resultant products to separate a gasoline fraction having an end boiling point of about 300° F., an intermediate product containing the heavier gasoline fractions, and insufficiently converted oil, passing the first-mentioned gasoline fraction and the insufficiently converted oil through a reaction zone in admixture with a powdered cracking catalyst and therein subjecting the mixture to a temperature in the approximate range of 500–900° F., whereby to produce substantially olefin-free gasoline, separating the resultant products into vapors and a suspension of unvaporized oil and powdered catalyst, fractionating and condensing the vapors, heating at least a portion of said suspension to a temperature in the approximate range of 900–1200° F. and passing vapors thus formed through said bed of catalyst.

WAYNE L. BENEDICT.